United States Patent [19]
Hill et al.

[11] Patent Number: 5,595,452
[45] Date of Patent: Jan. 21, 1997

[54] LINK ASSEMBLY AND BUSHING THEREFOR

[75] Inventors: Clinton W. Hill, Washington; Robert M. Crandall, Capac, both of Mich.

[73] Assignee: U.S. Farathane Corporation, Utica, Mich.

[21] Appl. No.: 988,475

[22] Filed: Dec. 10, 1992

[51] Int. Cl.⁶ ........................................ F16D 1/00
[52] U.S. Cl. ........................ 403/221; 403/228; 403/223
[58] Field of Search ............................... 403/221, 222, 403/223, 228, 226, 225, 291

[56] References Cited

U.S. PATENT DOCUMENTS

| | | | |
|---|---|---|---|
| 1,958,119 | 5/1934 | Tarr | 403/228 |
| 2,088,798 | 8/1937 | Leighton | 403/119 |
| 2,099,209 | 11/1937 | Hufferd | 403/52 |
| 2,608,751 | 9/1952 | Hutton | 403/228 |
| 3,230,000 | 1/1966 | Simpson | 403/228 |
| 3,762,747 | 10/1973 | Griffen | 403/225 |
| 3,904,300 | 9/1975 | Hetmann | 403/225 |
| 4,158,511 | 6/1979 | Herbenar | 403/113 |

*Primary Examiner*—Jack W. Lavinder
*Assistant Examiner*—James Miner
*Attorney, Agent, or Firm*—Lalos & Keegan

[57] ABSTRACT

A link assembly connectable to a member and adapted for rotary motion and conical deflection relative to the connectable member generally consisting of an elongated rigid member having an opening therethrough for receiving said connectable member therein. A bushing disposed in said connectable member opening, the bushing being formed of a thermoplastic polyurethane material and having an opening therethrough providing an interior, cylindrical wall therein. The interior cylindrical wall having a plurality of dimples therein.

27 Claims, 1 Drawing Sheet

LINK ASSEMBLY AND BUSHING THEREFOR

BACKGROUND OF THE INVENTION

This invention relates to a link assembly and more particularly to a link assembly adapted to be connected to another component by means of a pin, bolt or the like to permit rotary motion and conical deflection of the assembly relative to the connected component, as in a link assembly commonly used in a wheel suspension system of a vehicle. The invention further contemplates a novel bushing utilized in such an assembly.

In wheel suspension systems for vehicles, there commonly is provided a number of link assemblies connected to other components in a manner in which the link assemblies are required to be capable of both rotary motion and conical deflection relative to their connected components. Typically, such link assemblies consist of an elongated steel member having an opening therethrough, a rubber bushing disposed within the opening and a steel sleeve inserted within the rubber bushing for receiving a pin, bolt or stud to connect the link assembly to the other component. Because of the low abrasion resistance of rubber, rubber bushings in such applications are required to be bonded to the metallic link assembly. Such bonding, however, creates internal stresses in the rubber bushing during rotary motion of the link assembly relative to the connected component and, eventually, results in failure of the bushing. Rubber bushings have the further disadvantage of being subject to dry rotting over a period of usage, providing a further cause of failure. It thus has been found to be desirable to provide a link assembly having a bushing for receiving a pin, bolt or stud therethrough for securing the link assembly to another other component and allowing free rotary motion and conical deflection of the link assembly relative to the connected component in which the bushing will not be subjected to internal stresses causing it to tear apart or deteriorate over a period of usage.

Accordingly, it is the principal object of the present invention to provide an improved link assembly.

A further object of the present invention is to provide an improved link assembly adapted to be connected to another component in a manner whereby the link assembly is capable of rotary motion and conical deflection relative to the connected component.

A further object of the present invention is to provide an improved link assembly connectable to another component to permit both rotary motion and conical displacement of the link assembly relative to the connected component in which contacting components thereof will not be subjected to stress or deterioration resulting in failure.

A still further object of the present invention is to provide an improved link assembly provided with a novel bushing for connecting the link assembly to another component in a manner in which the link assembly is capable of rotary motion and conical deflection relative to the connecting component in which the bushing is not subjected to internal stresses or deterioration over a period of usage resulting in premature failure.

Another object of the present invention is to provide a novel bushing for a link assembly.

A further object of the present invention is to provide a novel bushing for a link assembly which will not be subject to deleterious internal stresses or deterioration over a period of usage resulting in a failure thereof.

A still further object of the present invention is to provide a novel bushing providing lubrication between contacting surfaces of the bushing and an inserted sleeve or other component consistent with providing an increased footprint of the bushing on such sleeve to correspondingly provide a more uniform loading on the sleeve.

Another object of the present invention is to provide a bushing for a link assembly providing minimal abrasion and noise.

A further object of the present invention is to provide a novel bushing for a link assembly which is simple in design, effective and durable in performance and economical to manufacture.

Other objects and advantages of the present invention will become more apparent to those persons having ordinary skill in the art to which the present invention pertains from the following description taken in conjunction with the accompanying drawing wherein:

BRIEF DESCRIPTION OF THE DRAWINGS

Referring to the drawing, there is illustrated a link assembly 10 embodying the present invention which includes an elongated rigid body member 10, a bushing 11 and a sleeve 12. The elongated body member includes a rod section 13 and a head section 14 having a cylindrical opening 15 therein. The rod section includes a collar portion 16 against which there may be positioned a washer 18 engaged by another component such as a bushing (not shown) which may be secured to the rod section within a set of recesses 19 and 20 provided between the collar and an end of the rod section. As shown in FIG. 1, the free end of the rod section may be threaded as at 21 to connect or mount the link assembly to another component of the suspension system.

Figure 1:
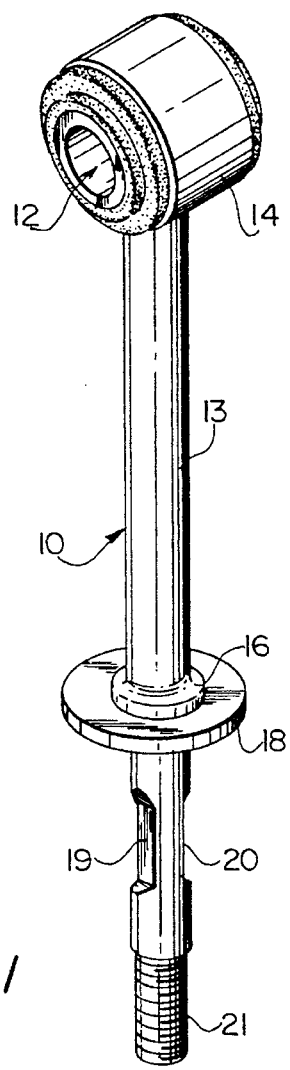
FIG. 1 is a perspective view of a link assembly adapted for use in a wheel suspension system of a vehicle, embodying the present invention.
Figure 2:
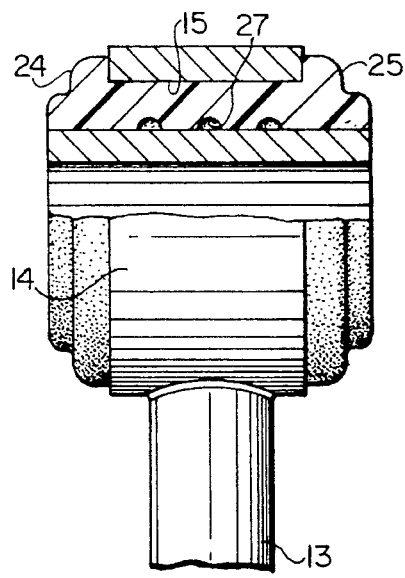
FIG. 2 is an enlarged side view of the link assembly shown in FIG. 1, illustrating a portion thereof in vertical cross-section and having a portion thereof cut away.

Bushing 11 consists of a body of internally lubricated, polyester based thermoplastic polyurethane material. The body is provided with an annular recess 22 having a bottom cylindrical wall surface 23. The diameter of cylindrical wall surface 23 is substantially the same as the inside diameter of opening 15 in head section 14 so that the bushing may be force fit into opening 15 to position the bushing in head section 14 as shown in FIGS. 1 and 2. In inserting the bushing in the head section, the resilient nature of the bushing would allow the annular portions 24 or 25 thereof to deflect and pass through opening 15 to snap the bushing in place within the head section. The diameter of cylindrical wall surface 23 can be formed the same or slightly smaller than the diameter of opening 15 to facilitate the insertion of the bushing into the head section and to provide a snug or loose fit of the bushing within the head section as desired.

Sleeve member 12 consists of a seamless steel tube received within the opening in the bushing and adapted to receive a pin, bolt or stud of a component to which the link assembly is to be connected or mounted. The sleeve member has an outside diameter slightly greater than of the internal cylindrical wall 26 of the bushing so that the sleeve member can be force fit into the bushing to secure it firmly. Preferably, the sleeve member has a hardness of 32–40 Rockwell C and is nickel plated.

Figure 3:
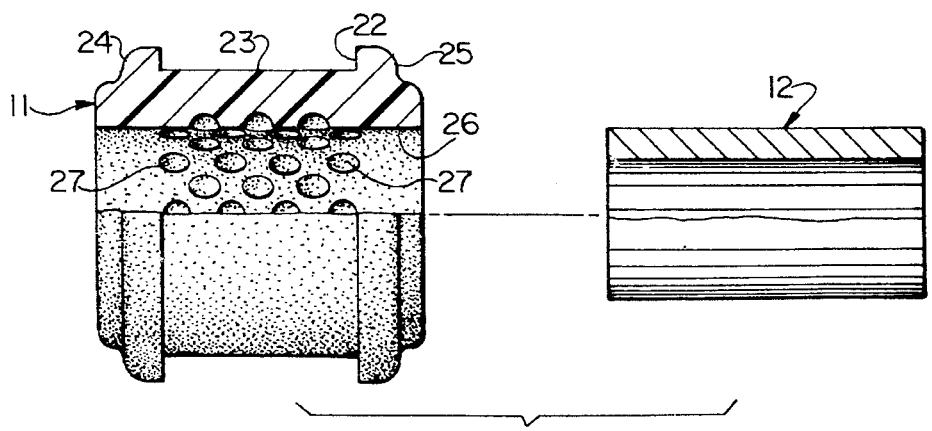
FIG. 3 is a side view of a bushing forming a component of the link assembly shown in FIGS. 1 and 2, illustrating a portion thereof in vertical cross-section and the components thereof in exploded relation.

As best shown in FIGS. 2 and 3, interior cylindrical wall 26 of the bushing is provided with a plurality of dimples 27. Preferably, the dimples are uniformly dispersed throughout interior cylindrical wall 26 to provide a sufficient footprint of the bushing to uniformly distribute the loading on the sleeve. In addition, outer and inner surfaces 23 and 26 of the bushing are provided with a lubricant such as mineral oil to facilitate displacement of mating surfaces and avoid squeaking.

Preferably, the bushing is formed of a polyester based thermoplastic polyurethane material internally lubricated with a mineral oil, having a hardness of 38 Shore D±5.

The high abrasion resistance of the bushing eliminates the necessity of bonding the bushing to head section 14. In addition, the high abrasion resistance of the bushing and the lubricated surfaces 23 and 26 permit sleeve member 12 to rotate freely within the bushing, and the bushing to rotate freely within the head section. During rotary motion of the link assembly, the sleeve simply turns and the type of internal stress characteristic of rubber bushings is never created. The functional superiority of the bushing material also permits the use of a shorter bushing and frame which allows greater conical deflection of the link assembly relative to the component to which it is connected.

In prior designs of the bushing, the interior surface of the bushing was provided with a plurality of raised portions or pimples, i.e., an inversion of the dimple design provided in the present bushing, which was found to reduce noise in various applications of the bushing. However, although the noise was eliminated in such applications initially, under severe operating conditions, the raised portions of the bushing were found to wear through the nickel plating on the sleeve, scoring it. The sleeve member then wore down the raised portions of the bushing creating a smooth surface which then had the effect of producing a squeaking noise. The dimpled design as described increases the footprint and thus more uniformly distributes the loading on the sleeve. Such design further has the advantage of providing a plurality of pockets which retain the lubricant to further reduce abrasion and noise.

From the foregoing detailed description, it will be evident that there are a number of changes, adaptations and modifications of the present invention which come within the province of those persons having ordinary skill in the art to which the aforementioned invention pertains. However, it is intended that all such variations not departing from the spirit of the invention be considered as within the scope thereof as limited solely by the appended claims.

We claim:

1. A link assembly connectable to a member and adapted for rotary motion and conical deflection relative to said connectable member comprising:

an elongated rigid member having an opening therethrough for receiving said connectable member therein; and a bushing disposed in said opening, said bushing being formed of a thermoplastic polyurethane material and having an opening therethrough providing a cylindrical wall therein, said cylindrical wall having a plurality of dimples.

2. A link assembly according to claim 1 wherein said connectable member receiving opening is disposed transversely relative to the length of said elongated rigid member.

3. A link assembly according to claim 1 wherein said elongated rigid member includes a second means for connecting said elongated rigid member to another component.

4. A link assembly according to claim 1 wherein said bushing includes an external, annular recess adapted to receive a portion of said elongated rigid member therein when said bushing is inserted in said connectable member opening.

5. A link assembly according to claim 1 wherein said bushing is internally lubricated.

6. A link assembly according to claim 1 wherein said dimples in said interior cylindrical wall of said bushing are distributed uniformly therein.

7. A link assembly according to claim 6 wherein said elongated rigid member includes a second means for connecting said elongated rigid member to another component.

8. A link assembly according to claim 6 wherein said bushing includes an exterior, annular recess adapted to receive a portion of said elongated rigid member therein when said bushing is inserted in said connectable member opening.

9. A link assembly according to claim 6 wherein said bushing is lubricated internally.

10. A link assembly according to claim 6 including a lubricant disposed between said bushing and said elongated rigid member and between a bushing and said sleeve member.

11. A link assembly according to claim 10 wherein said lubricant is a mineral oil.

12. A link assembly according to claim 1 including a rigid sleeve member disposed within said connectable member opening of said bushing for receiving said connectable member therein.

13. A link assembly according to claim 12 wherein said sleeve member comprises a seamless steel tube.

14. A bushing insertable in a connectable member opening of a rigid member to permit rotary motion and conical deflection of said rigid member relative to a connectable member inserted in said connectable member opening of said rigid member comprising a body formed of a thermoplastic polyurethane material having a connectable member receiving opening therethrough, said opening having an interior cylindrical surface provided with a plurality of dimples.

15. A bushing according to claim 14 wherein said body member includes an external, annular recess adapted to receive a portion of said rigid member therein when said bushing is inserted in the connectable member opening of said rigid member.

16. A bushing according to claim 14 wherein said body is internally lubricated.

17. A bushing according to claim 14 wherein said dimples in said interior cylindrical wall are distributed uniformly therein.

18. A bushing according to claim 14 including a rigid sleeve member disposed within said connectable member receiving opening for receiving said connectable member therein.

19. A bushing according to claim 18 wherein said rigid sleeve member comprises a seamless steel tube.

20. A bushing according to claim 18 wherein said body includes an exterior, annular recess adapted to receive a portion of said rigid member therein when said bushing is inserted in the connectable member opening of said rigid member.

21. A bushing according to claim 18 wherein said bushing is internally lubricated.

22. A bushing according to claim 18 wherein said dimples in said interior cylindrical wall of said body are distributed uniformly therein.

23. A bushing according to claim 18 including a lubricant disposed between said body and said sleeve member.

24. A bushing according to claim 23 wherein said lubricant is a mineral oil.

25. A bushing according to claim 14 wherein said body is formed of a polyester based thermoplastic polyurethane material.

26. A bushing according to claim 25 wherein said body is internally lubricated.

27. A bushing according to claim 14 wherein said body has a Rockwell hardness in the range of 38 Shore D±5.

* * * * *

UNITED STATES PATENT AND TRADEMARK OFFICE
CERTIFICATE OF CORRECTION

PATENT NO. : 5,595,452
DATED : January 21, 1997
INVENTOR(S) : Clinton W. Hill & Robert M. Crandall It is certified that error appears in the above-identified patent and that said Letters Patent is hereby corrected as shown below:

In Claim 6, Line 2, delete the word "interior".

Signed and Sealed this

Fifteenth Day of April, 1997

Attest:

BRUCE LEHMAN

*Attesting Officer*  *Commissioner of Patents and Trademarks*